(12) United States Patent
Anderson

(10) Patent No.: US 6,955,620 B2
(45) Date of Patent: *Oct. 18, 2005

(54) DRIVE SYSTEM FOR AN INFINITELY VARIABLE DRIVE TRANSMISSION

(76) Inventor: Lawrence A. Anderson, 10023 Winlake Dr., Cincinnati, OH (US) 45231

( * ) Notice: Subject to any disclaimer, the term of this patent is extended or adjusted under 35 U.S.C. 154(b) by 242 days.

This patent is subject to a terminal disclaimer.

(21) Appl. No.: 10/405,379

(22) Filed: Apr. 2, 2003

(65) Prior Publication Data

US 2003/0166426 A1 Sep. 4, 2003

Related U.S. Application Data

(63) Continuation-in-part of application No. 09/858,434, filed on May 16, 2001, now Pat. No. 6,575,856.
(60) Provisional application No. 60/376,661, filed on Apr. 30, 2002.

(51) Int. Cl.$^7$ .................................................. F16H 9/18
(52) U.S. Cl. ........................................... 474/17; 474/83
(58) Field of Search ............................. 474/83, 53, 55, 474/3, 6, 78, 119, 8, 17, 203

(56) References Cited

U.S. PATENT DOCUMENTS

| 826,969 | A | * | 7/1906 | Stephan | 475/211 |
| 837,651 | A | * | 12/1906 | Wandless | 474/53 |
| 2,801,547 | A | * | 8/1957 | Guibert | 474/83 |
| 3,906,809 | A | * | 9/1975 | Erickson | 474/83 |
| 4,875,389 | A | * | 10/1989 | Fragnito | 475/212 |

\* cited by examiner

Primary Examiner—Marcus Charles
Assistant Examiner—Vicky A. Johnson
(74) Attorney, Agent, or Firm—Frost Brown Todd LLC

(57) ABSTRACT

An improvement relating to an infinitely variable ratio transmission having a pair of oppositely oriented variable diameter torque input and output pulleys is disclosed wherein the conical surfaces of the pulleys include a multiplicity of axially and circumferentially movable sprocket bars to accommodate the fixed length of an inextensible drive belt or chain wrapping about the pulleys.

27 Claims, 7 Drawing Sheets

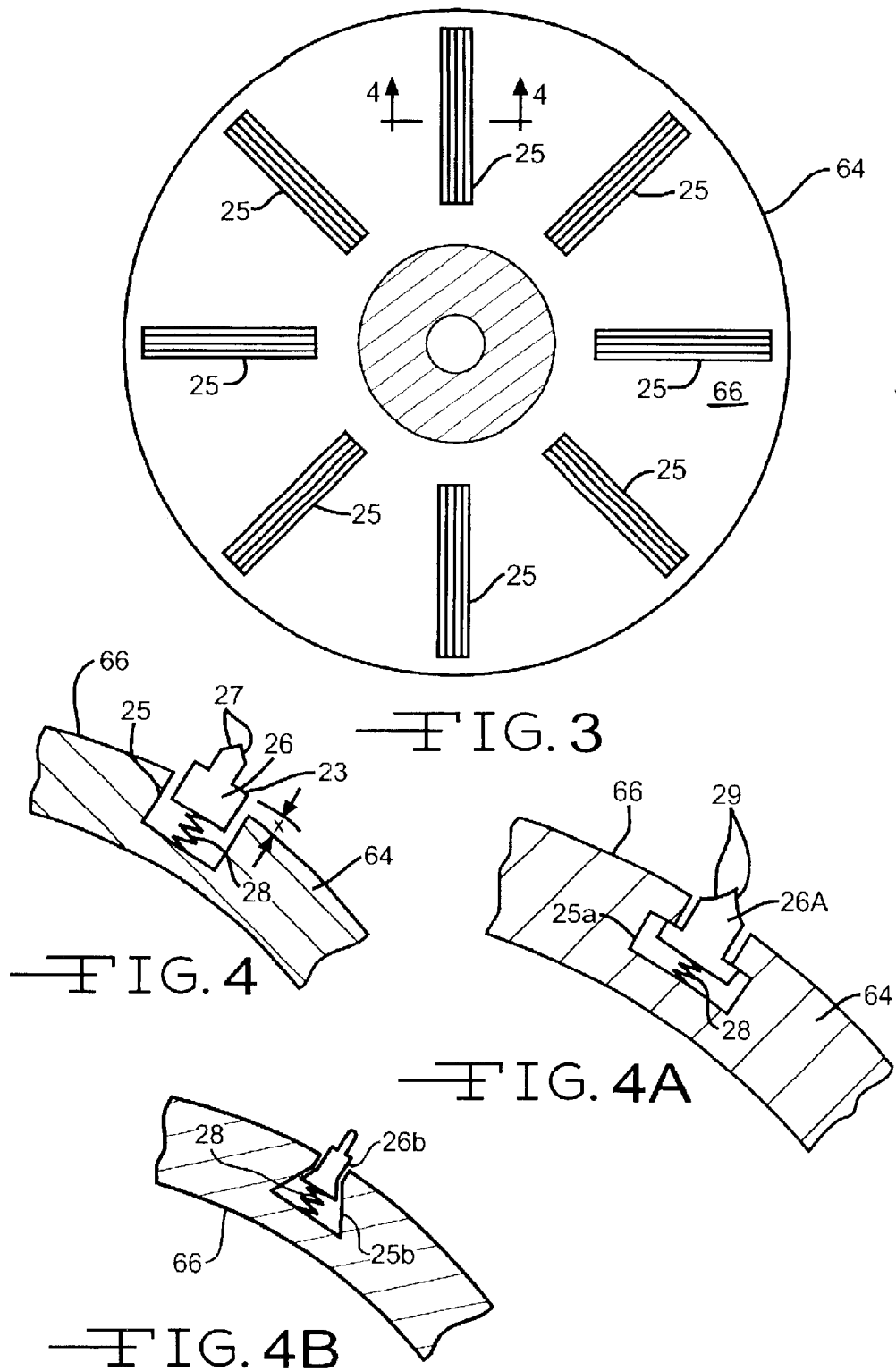

DRIVE SYSTEM FOR AN INFINITELY VARIABLE DRIVE TRANSMISSION

RELATED APPLICATIONS

This application is a continuation in part of my prior application Ser. No. 09/858,434, filed on May 16, 2001 now U.S. Pat. No. 6,575,856 entitled "Variable Drive Transmission and is incorporated herein by reference. Further this application claims the priority of Provisional Patent Application Ser. No. 60/376,661 entitled "Drive System For An Infinitely Variable Drive Transmission" filed on Apr. 30, 2002.

BACKGROUND OF THE INVENTION

The present invention generally relates to a power transmission whereby the input speed, from a constant velocity, prime mover, such as an automotive engine, or any other suitable power source, may be reduced to a desired output speed by the internal workings of the transmission.

More specifically the present invention relates to an infinitely variable ratio drive mechanism, of the endless belt type, having a pair of radially adjustable V shaped pulleys configured to rotate on a pair of parallel axes.

An endless, inextensible, belt or chain encircles and drivingly engages both pulleys whereby power may be transmitted from one pulley to the other. A variable speed reduction, between the pulleys, is obtained by selectively moving at least one sheave of each pulley toward or away from the other whereby the effective diameter of the pulleys are controllably varied.

It is well known to use opposing, variable pulleys as the driving member and the driven member in power transmissions as evidenced by the following sampling of U.S. Pat. Nos. 4,433,594; 5,011,461; 6,095,942; 6,135,916; 6,254,503.

In studying variable pulley transmission drive mechanisms it becomes apparent that the variable pulley drive mechanism merely emulates the dual cone variable drive transmission as described in the parent application. Rather than moving the drive belt, or chain, radially along the conical members of the dual cone configuration whereby the operating diameter of the conical members is varied to obtain a desired input to output RPM reduction, the axial distance between the sheaves of the variable pulleys is adjusted thereby emulating the action of the dual cone drive mechanism taught in the parent application.

SUMMARY OF THE INVENTION

The present invention teaches novel, free floating sprocket bars spaced about the surface of variable pulley's conical surfaces, or sheaves, and extending radially along the conical surface thereof. The sprocket bars generally parallel the surface of the pulley's conical surface. However, the sprocket bars may take any other convenient shape, such as a convex configuration, as described further below. By being free floating, the sprocket bars may freely move axially and circumferentially whereby they may engage a beaded or other suitably configured and generally inelastic, and inextensible drive chain.

BRIEF DESCRIPTION OF THE DRAWINGS

FIG. 3 is an elevational view taken along line 3—3 in FIG. 2.

FIG. 4 is a sectional view taken along line 4—4 in FIG. 3.

FIG. 4A presents an alternate embodiment of the structure illustrated in FIG. 4.

FIG. 4B presents a further alternate embodiment of the structure illustrated in FIG. 4.

DETAILED DESCRIPTION OF THE INVENTION

Referring now to FIGS. 1 through 4, FIG. 1 presents a diagrammatic view of the basic elements of my invention. A pair of variable diameter pulley assemblies 12 and 14 are positioned on fixed parallel axes 16 and 18

Variable diameter pulleys, their structure and operation are well known in the art as illustrated in the above prior art references. Therefore only their structure and operation that is pertinent to the present invention will be discussed in great detail.

Figure 2:
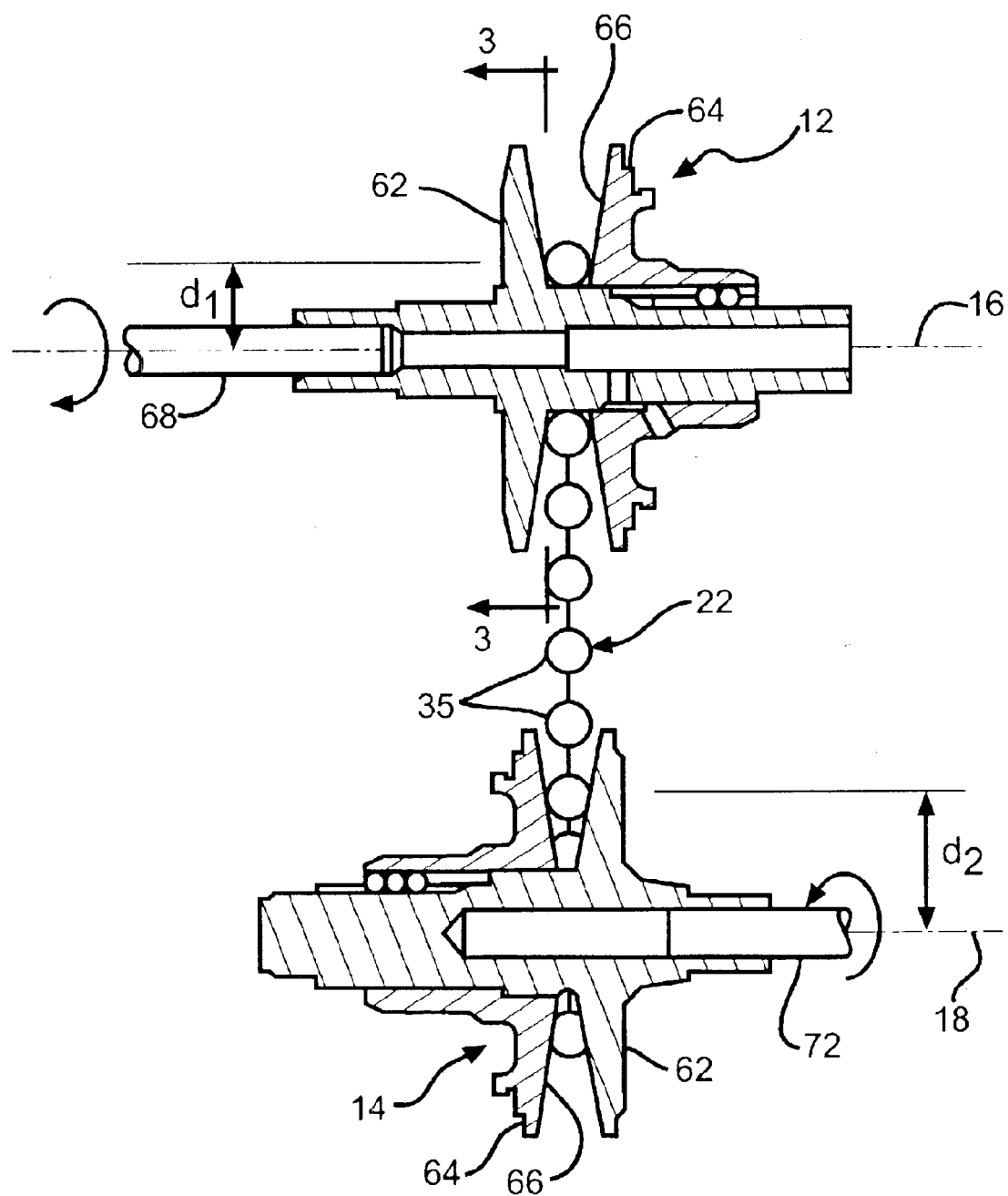
FIG. 2 is a sectional view taken along line 2—2 in FIG. 1.

Referring to FIG. 2, variable diameter pulleys 12 and 14 generally comprise a fixed conical flange 62 and an axially movable flange, or sheave, 64. However, it is also conceivable that both flange 62 and flange 64 may be movable. Thus recognizing that both pulley flanges may be movable, the following discussion will, for simplicity, assume that only flange 64 is radially movable.

As flange 64 moves toward and away from fixed flange 62, the "V" groove between the two flanges will narrow and/or widen respectively. Thus, for a drive chain having a given chain width, the effective working diameter of the pulley may be selectively varied. As the flanges move together, the working diameter of the flange increases and moves the drive chain radially outward within the "V" groove. As the pulleys move apart, the working diameter decreases and the drive chain moves closer to the bottom of the pulley "V" groove. Thus the "gear" ratio of the input revolutions per minute (RPM) of input pulley 12 to the output pulley 14 may be selectively varied by varying the width of the "V" groove of pulley 12, 14 or both to obtain a desired reduction gear ratio between input pulley 12 and output pulley 14.

With the above basic understanding of variable diameter pulleys in a "gear reduction" application, the improvement offered by the present invention will be discussed in detail below.

Since the structure of the variable diameter pulley assemblies 12 and 14 are, for this teaching of the invention, considered identical, a detailed description of pulley assembly 12 will generally follow with the understanding that both pulley assemblies 12 and 14 are, basically, identical in structure and function, and generally interchangeable.

Figure 1:
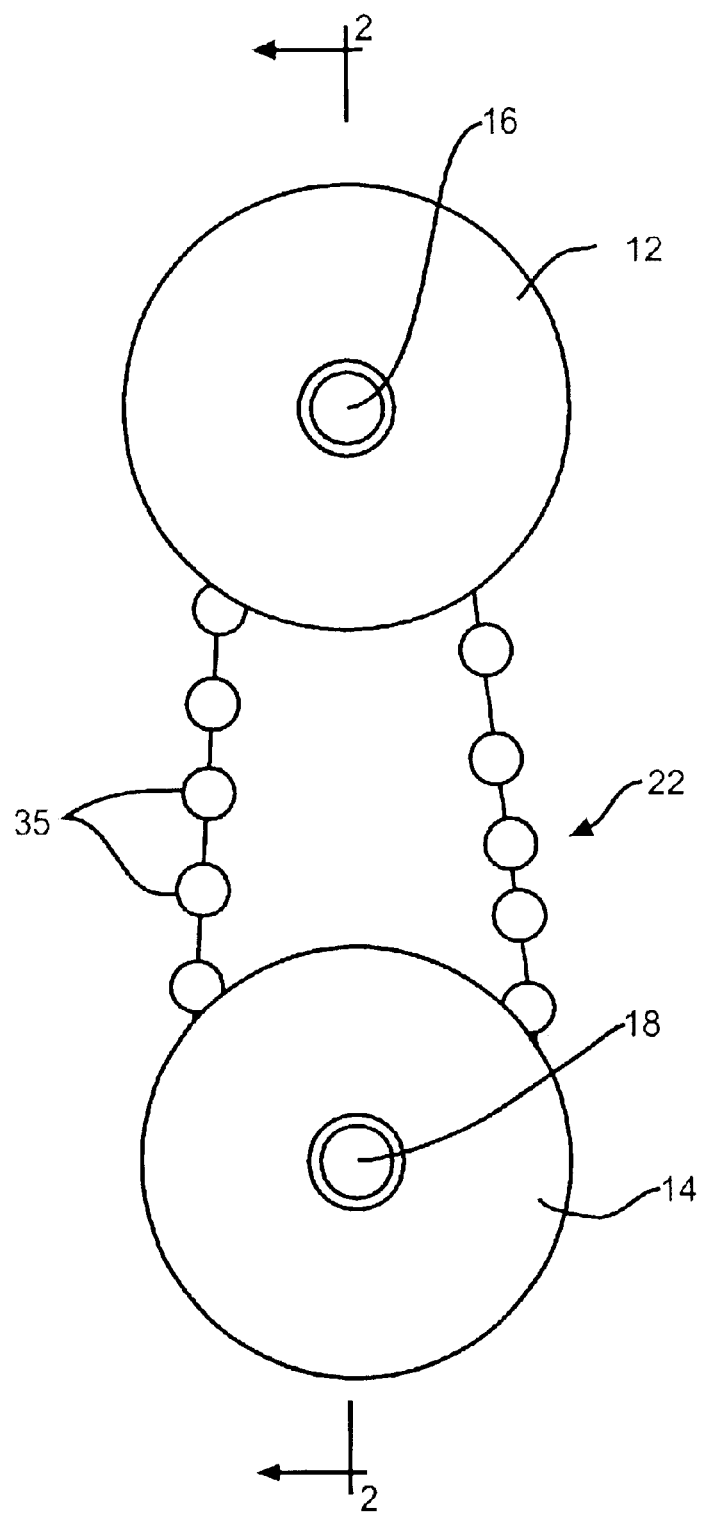
FIG. 1 presents a schematic, end elavational view of the primary elements of my new and improved transmission.

Generally, power input to the system will be through a primary or driving variable pulley 12 and transmitted to the secondary driven variable diameter pulley 14 by way of an endless, inextensible, chain, notched belt, or beaded chain, as illustrated by element 22, encircling both the driving pulley 12 and the driven pulley 14 as illustrated in FIGS. 1 and 2.

As illustrated in FIGS. 3 and 4, The conical surfaces of variable diameter pulleys 12 and 14 include radially directed groove like channels 25 receiving therein elongated sprocket bars or cogs 26. Channels 25 are circumferentially wider than sprocket bars 26 thereby permitting circumferential movement of sprocket bar 26 within channel 25 as will be discussed further below. Further, sprocket bars 26 are resiliently received within channels 25 by action of one or more compression springs 28, or any other suitable elastic element, positioned between sprocket bar 26 and the bottom of channel 25, thereby biasing each sprocket bar 26 outward toward the surface 66 of flange 64, as illustrated in FIGS. 4 through 4B.

Alternatively, channels 25 may be shaped as an inverted "T" and sprocket bars 26 provided with a conforming "T" shape whereby the channel configuration 25a would retain sprocket bar 26A therein as shown in FIG. 4A. Similarly, any other type of known configurations might be used for retaining sprocket bars 26 within channels 25 such as a wedge or triangular shaped configuration as illustrated in FIG. 4B. Alternatively, the sprocket bars 26 of FIG. 4 may be retained within their respective channels as taught in my parent application as identified above.

Sprocket bars 26 may be configured, as illustrated in FIG. 4, with a wedge shaped top having straight, or flat surfaces 27 or, as illustrated in FIG. 4A, having scalloped surfaces 29. The exact configuration of the sprocket bars will necessarily vary depending upon the application for which they are being used. Shoulder 23 of sprocket bar 26 preferably extends a distance x above the surface 66 of the pulley flange surface as illustrated in FIG. 4.

Figure 5:
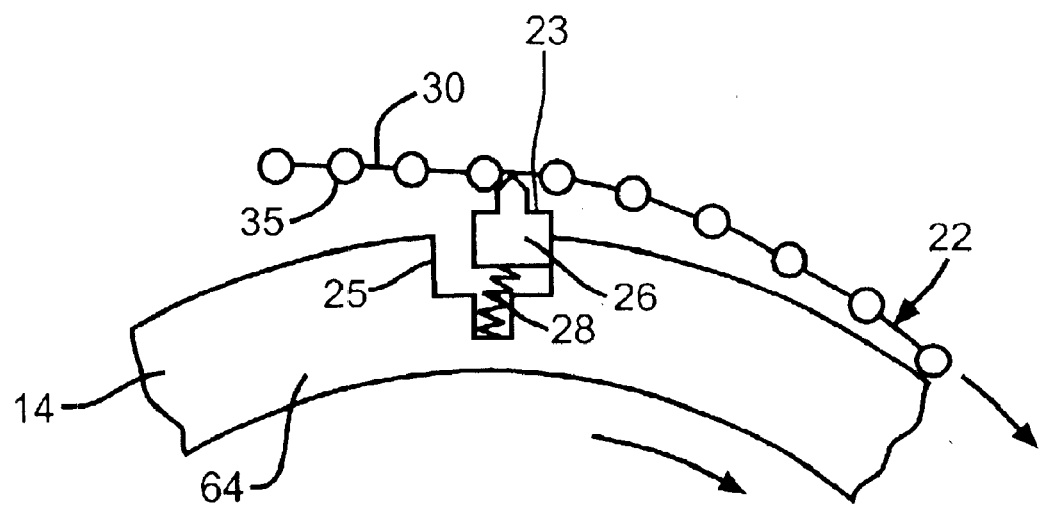
FIG. 5 presents a crossectional view, similar to that of FIG. 4 showing the floating sprocket bar in engagement with a beaded drive chain.

In operation, beads 35 may rest upon shoulder 23 when engaging the sprocket bars 26 or may ride upon the sprocket bar as illustrated in FIG. 5. The floatability of sprocket bars 26 compensates for the variation of required length of the inextensible drive chain, as the working diameter of the variable pulleys are varied, by floating the drive chain above surface 66 of the pulley flange as illustrated in FIG. 5. The reader is directed to my parent application, referenced above, for a detailed discussion of the required belt or chain length necessary to encircle pulleys 12 and 14, as the pulley's working diameters change.

Referring now to FIGS. 1, 2, and 5. It is assumed for the following operational discussion that variable diameter pulley 12 is the driving (or input pulley) and variable diameter pulley 14 is the driven (or output pulley). Driving torque is transferred from the transmission input means (not shown) to input shaft 68 extending from variable diameter input pulley 12. By an inextensible chain drive, the driving torque is transferred to variable diameter output pulley 14 through inextensible beaded drive chain 22. The output torque is then transferred to the transmission output shaft 72 extending from variable output pulley 14. When inextensible drive chain 22 is at the exact mid point of variable diameter pulleys 12 and 14, the gear ratio between pulleys 12 and 14 will be 1 to 1, provided that the pulleys are identical.

However, as pulley 12 widens and pulley 14 narrows, as illustrated in FIG. 2, the ratio of RPM between pulley 12 to pulley 14 will be greater than 1, with the exact ratio being dependent upon the given working diameters d1 and d2 of pulleys 12 and 14. Thus input pulley 12 will be turning at a faster RPM than output pulley 14.

Except for the floating sprocket bars, many prior patents teach the above basic principle. For example see U.S. Pat. Nos. 4,433,594; 5,011,461; 6,095,942; 6,135,916; and 6,254,503.

Figure 6:
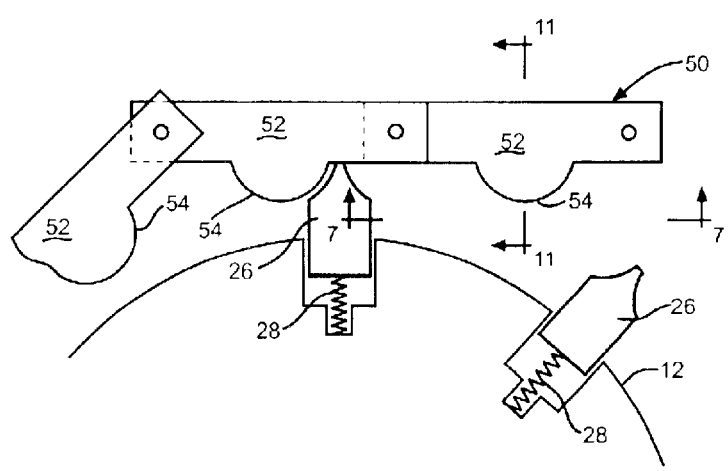
FIG. 6 presents an alternate embodiment for the drive chain shown in FIGS. 1 and 2.
Figure 11:
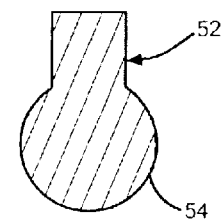
FIG. 11 presents a crossectional view taken along line 11—11 in FIG. 6.

Referring to FIG. 5, when using an inextensible beaded chain 22 as illustrated, wherein a given gap 30 separates beads 35, one may not be certain that as chain 22 wraps around the flanges of variable diameter pulleys 12 or 14 that the sprocket bars 26 will always be positioned between two adjacent beads. However, by permitting the sprocket bar 26 to move inward and/or shift cirumferentially, if a bead 35 impinges upon a sprocket bar as chain 22 wraps about the pulley's flanges, sprocket bar 26 may move to accommodate the fixed immovable position of the bead, as illustrated in FIG. 5, and thereby transmit torque to chain 22. Although the inextensible chain embodiment illustrated herein comprises an inextensible beaded chain, other inextensible chain, and/or belt, configurations are feasible. For example, FIG. 6 illustrates an alternate embodiment for an inextensible, linked, drive chain 50 wherein a portion of linked chain 50 is illustrated having hinged, or pivoting links 52. Each link 52 includes a spherical portion 54 for engagement with sprocket bars 26 on the flanges of the variable diameter pulleys 12 and 14.

Figure 8:
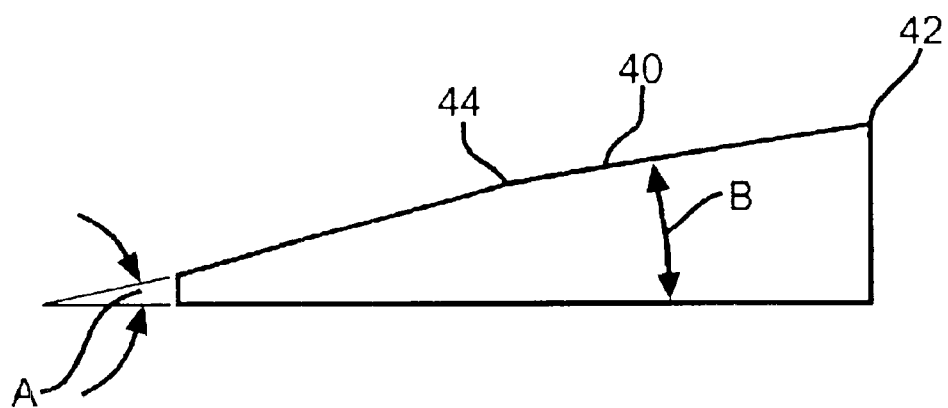
FIG. 8 presents a schematic view of an alternate embodiment for the conical surface of the variable diameter flanges illustrated in FIG. 2, illustrating a dual conical angle profile.

Further, under certain given circumstances it may be desirable that variable diameter pulleys 12 and 14 are configured with a double cone angle as illustrated in FIG. 8. Referring to FIG. 8, variable diameter pulley flange surface 40 includes a first conical angle A from the smaller diameter 46 to mid point 44 and a smaller conical angle B from mid point. 44 to the large diameter 42. Further, it is conceivable that a multiple number (three or more) of cone angles may be employed with decreasing cone angles as one moves away from the small diameter end 46 toward the large diameter end 42.

In a further alternate embodiment, the multiple angled conical configuration maybe replaced by a continuously curved surface such as an elliptical, parabolic, or hyperbolic curved surface.

Although eight equally spaced sprocket bars are illustrated, in FIG. 3, for teaching my invention herein, any number of sprocket bars may be used. Further it may be advantageous, in some applications, to space sprocket bars 26 unevenly about the circumference of the pulley flanges. Also, for particular end uses, it may be desirable to have different sprocket bar arrangements for each conical surface of the pulley flange.

Figure 9:
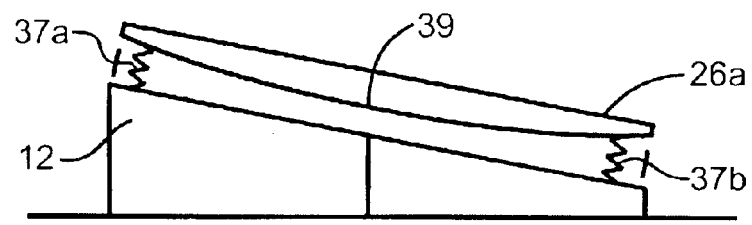
FIG. 9 presents a crossectional schematic view of an alternate embodiment wherein the conical face of the variable diameter pulley flange has convexly configured sprocket bars.

FIG. 9 presents an additional alternate embodiment wherein a free floating, convexly configured sprocket bar 26a is illustrated. It is believed that use of a, free floating sprocket bar having a convex configuration, as illustrated in FIG. 9, may duplicate the effect of the multi tapered conical flange surface taught above. The high point 39 of the convexity would be located at the midpoint of the pulley's conical flange surface 66. In this embodiment it is conceived that sprocket bar 26a may rock about high point 39, on the bottom surface of the sprocket channel, and have compression springs 37a and 37b positioned at each end of sprocket bar 26a biasing the ends of sprocket bar 26a axially outward.

Figure 12:
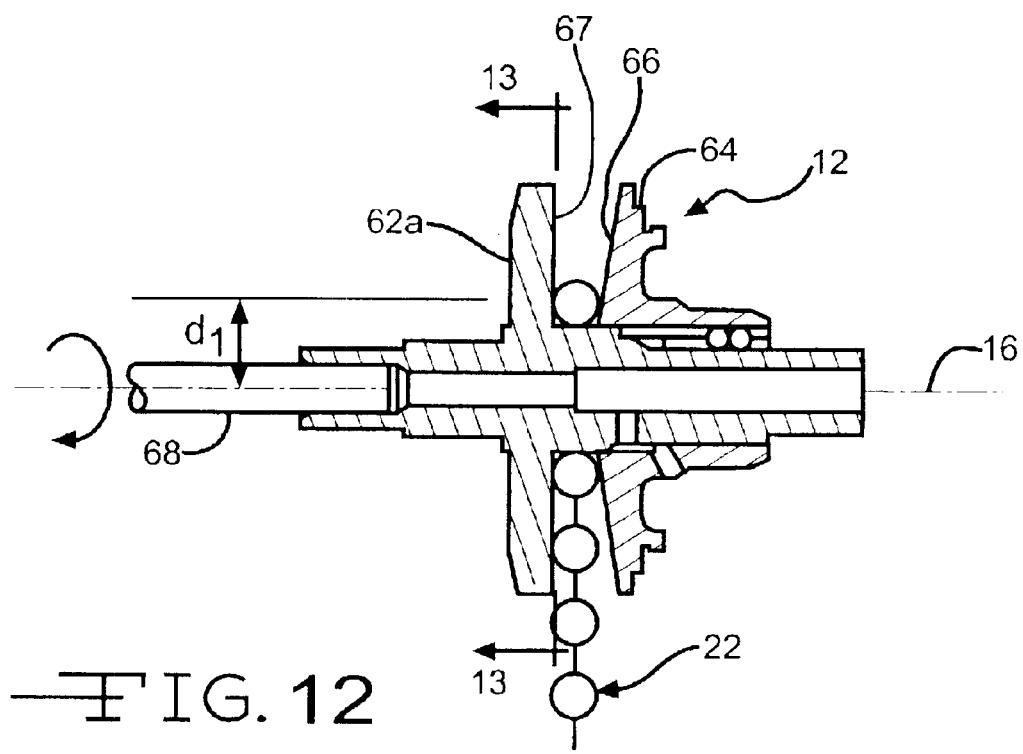
FIG. 12 presents a crossectional view, similar to the top portion of FIG. 2, showing an alternate embodiment of the variable pulley.
Figure 13:
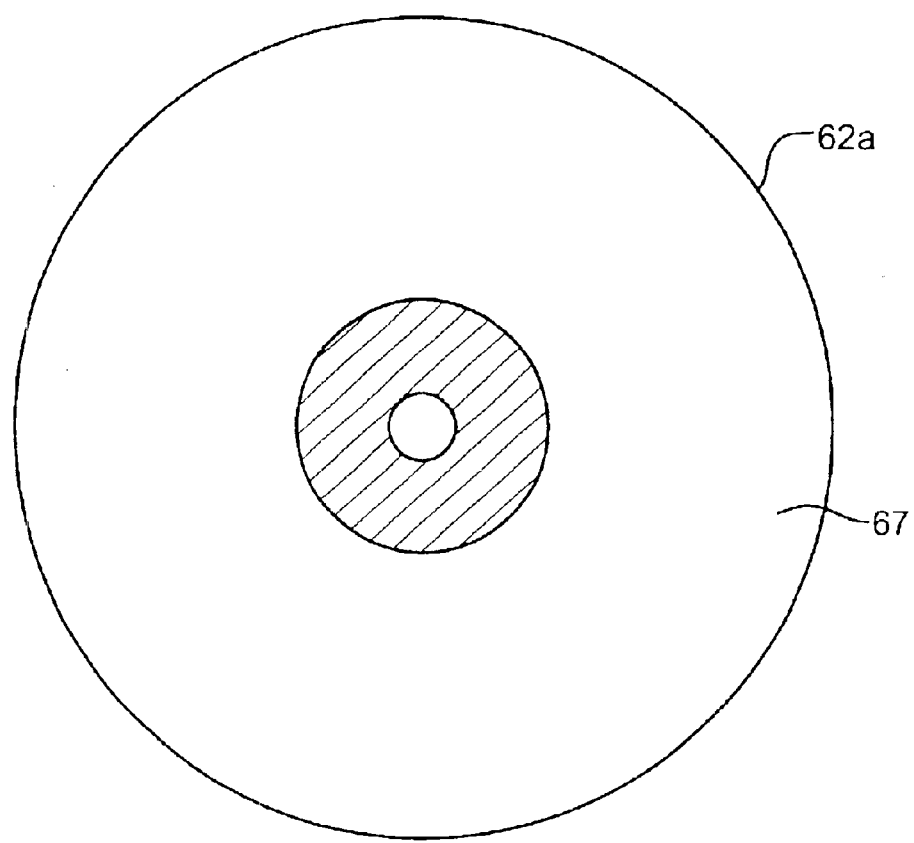
FIG. 13 is an elevational view, taken along line 13—13 in FIG. 12.

A further alternate embodiment of the present invention is illustrated in FIGS. 12 and 13. In FIG. 12 fixed pulley sheave 62a includes a vertically configured flange face 67. Flange face 67 may be smooth and planer, or may include a multiplicity of floating sprocket bars as taught in FIGS. 2 through 4.

Figure 10:
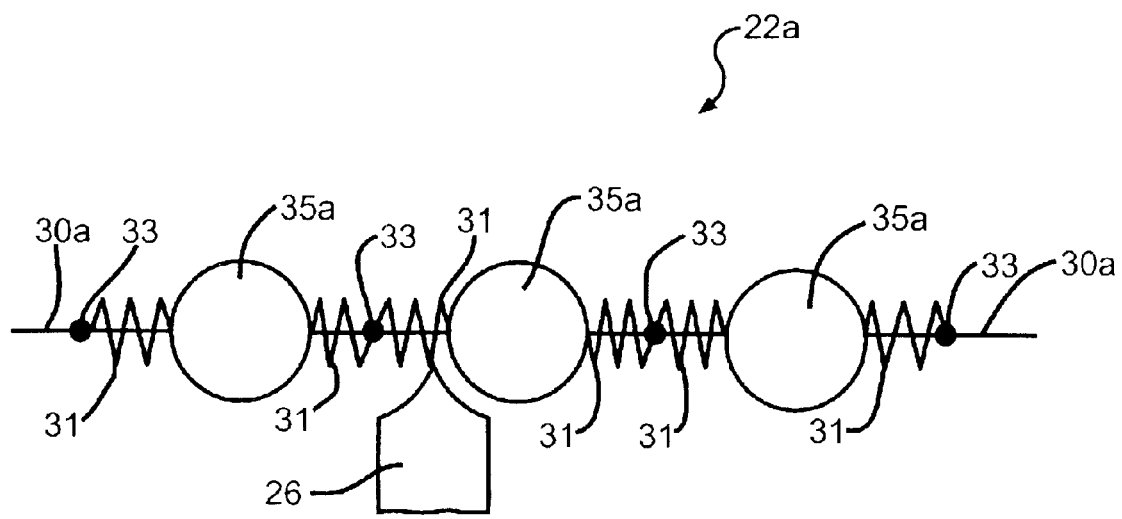
FIG. 10 presents an alternate embodiment, of my invention, wherein the inextensible beaded drive chain includes floating beads.

Although the embodiments as taught herein are believed to be the most preferred embodiments of the invention, FIG. 10 schematically illustrates an alternate embodiment wherein the drive chain 22a includes movable beads 35a slidingly received on a continuous, inextensible, runner, band or cable, 30a. Positioned upon runner 30a are equally spaced hard stops 33 rigidly affixed to runner 30a. A locating spring, or any other suitable resilient means, 31 positions beads 35a midway between the hard stops. Thus both the sprocket bar 26 and movable beads 35a may cooperatingly shift circumferentally to accommodate the fixed, inextensible length of drive chain 22a.

A further alternate embodiment may comprise a drive chain such as 22a, as taught immediately above, wherein sprocket bar 26, having only one degree of freedom, is free to move axially, but not circumferentially whereby the free float of beads 35a accommodate the fixed inextensible drive chain length.

Figure 7:
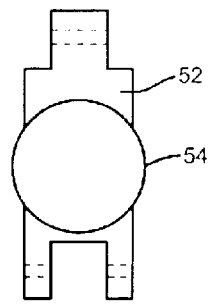
FIG. 7 presents a view taken along line 7—7 in FIG. 6.

Similar to the free floating beads 35a, as taught immediately above, the spherical portion 54 of chain link 50, in FIGS. 6 and 7, may be modified to be free floating within link 50.

While I have described above the principles of my invention in connection with specific embodiments, it is to be clearly understood that this description is made only by way of example and not as a limitation of the scope of my invention as set forth in the accompanying claims.

I claim:

1. In an infinitely variable ratio transmission having a first variable diameter pulley torque input member and a second variable diameter pulley output member, wherein said second variable diameter pulley is oriented with respect to said first variable diameter pulley such that the axis of rotation of said second variable diameter pulley is parallel to the axis of rotation of said first variable diameter pulley wherein torque is transmitted from said first variable diameter pulley to said second variable diameter pulley by an endless, inextensible belt, the improvement comprising:
   a) a multiplicity of radially extending channels circumferentially spaced over conical surfaces of said variable diameter pulleys,
   b) a sprocket bar positioned in each of said radially extending channels for engaging said inextensible belt, wherein said sprocket bars are free to move both normal to said pulley's surface and circumferentially within each of said channels,
   c) resilient means positioned between said sprocket bars and their associated channel bottom whereby said sprocket bars are biased outward toward said pulley's conical surface.

2. The improvement as claimed in claim 1 wherein said inextensible endless belt comprises a beaded chain.

3. The improvement as claimed in claim 1 wherein said inextensible belt comprises a linked chain.

4. The improvement as claimed in claim 1 wherein said pulley's conical surfaces comprise a first conical angle extending from the smaller diameter end to the midpoint of said conical surface and a second conical angle extending from said midpoint to the large diameter end of said pulley's conical surface.

5. The improvement as claimed in claim 4 wherein said first conical angle is greater than said second conical angle.

6. The improvement as claimed in claim 5 wherein said second conical angle lies within the range of four to ten percent smaller than said first conical angle.

7. The improvement as claimed in claim 6 wherein said second conical angle is six percent smaller than said first conical angle.

8. The improvement as claimed in claim 1 wherein said pulley's conical surfaces include three or more conical angles and wherein said conical angles progressively decrease from the small diameter end of said pulley's conical surface to the large diameter end of said pulley's conical surface.

9. The improvement as claimed in claim 1 wherein said sprocket bar includes a convex bottom surface wherein the high point of said convexity is positioned at the longitudinal midpoint of said pulley's conical surface.

10. The improvement as claimed in claim 1 wherein said variable diameter pulleys are of differing outside diameters.

11. The improvement as claimed in claim 1 wherein at least one sheave of at least one of said variable diameter pulleys is at a right angle to the axis of rotation of said pulley.

12. An infinitely variable ratio drive transmission comprising:
   a) a variable diameter pulley input torque member and a variable diameter pulley output torque member, wherein said variable diameter pulleys are oriented with respect to one another such that the axis of rotation of said torque input variable diameter pulley is parallel to said axis of rotation of said torque output variable diameter pulley,
   b) an inextensible, endless belt means circumscribing said variable diameter pulley input torque member and said variable diameter pulley output torque member whereby said input torque is transferred from said input variable diameter pulley to said output variable diameter pulley,
   c) a multiplicity radially extending channels circumferentially spaced over a conical surface of said variable diameter pulleys,
   d) a sprocket bar positioned in each of said radially extending channels for engaging said belt, wherein said sprocket bars are free to move both normal to said pulley's conical surface and circumferentially within said channel,
   e) resilient means positioned between said sprocket bars and their associated channel bottom whereby said sprocket bar is biased outward toward said pulley's conical surface.

13. The transmission as claimed in claim 12 wherein said inelastic inextensible endless belt means comprises a beaded chain.

14. The transmission as claimed in claim 13 wherein said beaded chain includes floating beads.

15. The transmission as claimed in claim 12 wherein said inelastic inextensible endless belt means comprises a linked chain.

16. The transmission as claimed in claim 12 wherein said variable diameter pulleys surfaces comprise a first conical angle extending from the smaller diameter end to the longitudinal midpoint of said variable diameter pulley's surface and a second conical angle extending from said longitudinal midpoint to the large diameter end of said variable diameter pulley.

17. The transmission as claimed in claim 16 wherein at least one of said variable diameter pulleys includes a curved surface extending from said small diameter end to said large diameter end.

18. The transmission as claimed in claim 17 wherein the slope of the curved surface progressively decreases from said small diameter end to said large diameter end.

19. The transmission as claimed in claim 16 wherein said first conical angle is greater than said second conical angle.

20. The transmission as claimed in claim 19 wherein said second conical angle lies within the range of four to ten percent smaller than said first conical angle.

21. The transmission as claimed in claim 20 wherein said second conical angle is six percent smaller than said first conical angle.

22. The transmission as claimed in claim 12 wherein said variable diameter pulleys include three or more conical angles and wherein said conical angles progressively decrease from the small diameter end of said variable diameter pulley to the large diameter end of said variable diameter.

23. An infinitely, variable ratio, drive transmission comprising:
  a) a first variable diameter pulley torque input member and a second matching variable diameter torque output member, wherein the axis of said first member is parallel to the axis of said second member,
  b) an endless, inextensible belt means circumscribing said input torque member and said output torque member whereby said input torque is transferred from said input torque member to said output torque member,
  c) a of extending channels circumferentially spaced over an external conical surface of said input torque and output torque members,
  d) a sprocket bar positioned in each of said radially extending channels for engaging said belt means wherein said sprocket bars are free to move both normal to said pulley's conical surface and circumferentially within said channel,
  e) resilient means positioned between said sprocket bars and their associated channel bottom whereby said sprocket bar is biased outward toward said pulley's surface.

24. An infinitely variable ratio drive transmission comprising:
  a) a variable diameter pulley torque input member and a matching variable diameter pulley torque output member,
  b) an inextensible endless belt circumscribing said input torque member and said torque output member whereby said input torque is transferred from said torque input member to said torque output member, said belt including an inextensible runner having a multiplicity of free floating beads thereon,
  c) a multiplicity of radially extending channels circumferentially spaced over said variable diameter pulley's flanged surface,
  d) a sprocket bar positioned within each of said radially extending channels for engaging said belt and wherein,
  e) said resilient means is positioned between said sprocket bars and their associated channel bottom whereby said sprocket bars are biased outward toward the surface of said variable pulley's flange surface.

25. In an infinitely variable ratio transmission having a first variable diameter pulley torque input member and second variable diameter pulley output member, each of said variable diameter pulleys having a first and second sheave, said second variable diameter pulley being oriented with respect to said first variable diameter pulley such that the axis of rotation of said second variable diameter pulley is parallel to the axis of rotation of said first variable diameter pulley wherein torque is transmitted from said first variable diameter pulley to said second variable diameter pulley by an endless, inextensible belt, the improvement comprising:
  a) a multiplicity of radially extending channels circumferentially spaced over the surface of said first sheave of each said variable diameter pulley,
  b) a sprocket bar positioned in each of said radially extending channels for engaging said inextensible belt, wherein said sprocket bars are free to move both normal to said pulley's surface and circumferentially within each of said channels,
  c) resilient means positioned between said sprocket bars and their associated channel bottom whereby said sprocket bars are biased outward toward said pulley's surface.

26. The improvement as claimed in claim 25 wherein the extended surface of said second sheave, of at least one of said variable diameter pulleys, intersects said axis of rotation at a right angle.

27. The improvement as claimed in claim 26 wherein the surface of said second sheave includes:
  a) a multiplicity of radially extending channels circumferentially spaced over the conical surface of said first sheave of each said variable diameter pulley,
  b) a sprocket bar positioned in each of said radially extending channels for engaging said inextensible belt, wherein said sprocket bars are free to move both normal to said pulley's surface and circumferentially within each of said channels,
  c) resilient means positioned between said sprocket bars and their associated channel bottom whereby said sprocket bars are biased outward toward said pulley's conical surface.

* * * * *

UNITED STATES PATENT AND TRADEMARK OFFICE
CERTIFICATE OF CORRECTION

PATENT NO. : 6,955,620 B2  Page 1 of 1
APPLICATION NO. : 10/405379
DATED : October 18, 2005
INVENTOR(S) : L. A. Anderson It is certified that error appears in the above-identified patent and that said Letters Patent is hereby corrected as shown below:

In column 6, Claim 12 sub paragraph c, at line 46, change "multiplicity radially" to read ...multiplicity of radially...

In column 6, Claim 12, sub paragraph c, at line 47, change "over a conical surface" to read ...over the conical surface ...

In column 7, Claim 23, sub paragraph c, at line 38, change "a of extending" to ...a multiplicity of radially extending...

In column 7, Clain 23, sub paragraph c, at line 39, change "an external" to read ...the external...

In column 8, Claim 25, sub paragraph a, at line 26, change "the surface" to read ...the conical surface...

In column 8, Claim 25, sub paragraph c, at lines 36-37, change "pulley's surface" to read ...pulley's conical surface...

Signed and Sealed this

Fifteenth Day of August, 2006

JON W. DUDAS
*Director of the United States Patent and Trademark Office*